United States Patent
Hu

(10) Patent No.: US 10,803,137 B2
(45) Date of Patent: Oct. 13, 2020

(54) METHOD AND APPARATUS FOR GROUPING WEB PAGE LABELS IN A WEB BROWSER

(71) Applicant: Alibaba Group Holding Limited, Grand Cayman (KY)

(72) Inventor: Yuxiang Hu, Hangzhou (CN)

(73) Assignee: ALIBABA GROUP HOLDINGS LIMITED, Grand Cayman (KY)

( * ) Notice: Subject to any disclaimer, the term of this patent is extended or adjusted under 35 U.S.C. 154(b) by 258 days.

(21) Appl. No.: 15/767,925

(22) PCT Filed: Oct. 26, 2016

(86) PCT No.: PCT/CN2016/103326
§ 371 (c)(1),
(2) Date: Apr. 12, 2018

(87) PCT Pub. No.: WO2017/076200
PCT Pub. Date: May 11, 2017

(65) Prior Publication Data
US 2018/0307768 A1    Oct. 25, 2018

(30) Foreign Application Priority Data
Nov. 4, 2015  (CN) .......................... 2015 1 0742568

(51) Int. Cl.
*G06F 16/954* (2019.01)
*G06F 16/957* (2019.01)
(Continued)

(52) U.S. Cl.
CPC .......... *G06F 16/954* (2019.01); *G06F 3/0483* (2013.01); *G06F 16/00* (2019.01);
(Continued)

(58) Field of Classification Search
CPC ................... G06F 16/00; G06F 40/30
(Continued)

(56) References Cited

U.S. PATENT DOCUMENTS 7,793,226 B2  9/2010 Sorenson et al.
8,191,007 B1  5/2012 Veloz
(Continued)

FOREIGN PATENT DOCUMENTS

CN  102937996 A  2/2013
CN  103377239 A  10/2013
(Continued)

OTHER PUBLICATIONS

Extended European Search Report to corresponding EP Application No. 16861468.3 dated Apr. 25, 2019 (10 pages).
(Continued)

*Primary Examiner* — Hung T Vy
(74) *Attorney, Agent, or Firm* — James J. DeCarlo; Greenberg Traurig, LLP

(57) ABSTRACT

Disclosed in the embodiments of the disclosure are methods and apparatuses for grouping web page labels. The method comprises: extracting titles of a plurality of web page labels in a tab bar of a browser; calculating semantic distances between the extracted plurality of titles; clustering web page labels corresponding to the plurality of titles based on the semantic distances between the plurality of titles; obtaining at least one label group based on the clustering, the one label group comprising at least one web page label; and sequentially arranging the at least one label group in the tab bar, the web page labels belonging to the same label group being successively arranged in the tab bar. After grouping, the web page labels are still presented in the format of web page labels in the tab bar and a web page label can be selected with a single click. Moreover, web page labels belonging to
(Continued)

the same label group are successively arranged together in the tab bar, such that the web page labels in the tab bar are arranged and ordered and a user can find a needed web page label quickly through the tab bar, thus improving user experience.

20 Claims, 10 Drawing Sheets

(51) Int. Cl.
G06F 16/00 (2019.01)
G06F 40/30 (2020.01)
G06F 3/0483 (2013.01)
G06K 9/62 (2006.01)

(52) U.S. Cl.
CPC .......... *G06F 16/9577* (2019.01); *G06F 40/30* (2020.01); *G06K 9/6215* (2013.01); *G06K 9/6223* (2013.01)

(58) Field of Classification Search
USPC .................................. 707/737, 794; 704/9
See application file for complete search history.

(56) References Cited

U.S. PATENT DOCUMENTS

| | | | |
|---|---|---|---|
| 8,375,321 B2 | 2/2013 | Moreno et al. | |
| 8,473,532 B1* | 6/2013 | Ben | G06F 16/16 707/829 |
| 8,510,673 B2 | 8/2013 | Sauve et al. | |
| 8,631,340 B2 | 1/2014 | Schreiner et al. | |
| 8,713,444 B2 | 4/2014 | Sauve et al. | |
| 8,762,879 B1 | 6/2014 | Goodger et al. | |
| 8,910,070 B2 | 12/2014 | Goodger et al. | |
| 9,110,568 B2 | 8/2015 | Jitkoff et al. | |
| 9,195,372 B2 | 11/2015 | Singh | |
| 9,424,102 B2 | 8/2016 | Boenisch et al. | |
| 9,569,412 B1 | 2/2017 | Broomhall et al. | |
| 9,703,887 B2 | 7/2017 | Broomhall et al. | |
| 2004/0093562 A1 | 5/2004 | Diorio et al. | |
| 2006/0155728 A1* | 7/2006 | Bosarge | G06F 16/9574 |
| 2007/0073599 A1* | 3/2007 | Perry | G06Q 30/02 705/26.5 |
| 2007/0156665 A1* | 7/2007 | Wnek | G06F 16/355 |
| 2008/0005686 A1 | 1/2008 | Singh | |
| 2009/0327947 A1 | 12/2009 | Schreiner et al. | |
| 2011/0131523 A1 | 6/2011 | Grant et al. | |
| 2011/0238408 A1* | 9/2011 | Larcheveque | G06F 40/35 704/9 |
| 2011/0295903 A1* | 12/2011 | Chen | G06F 16/367 707/794 |
| 2012/0131485 A1 | 5/2012 | Svendsen et al. | |
| 2013/0086506 A1 | 4/2013 | Molander et al. | |
| 2014/0164960 A1 | 6/2014 | Kuo et al. | |
| 2015/0205449 A1* | 7/2015 | Sinha | G06F 16/904 715/234 |
| 2015/0205462 A1* | 7/2015 | Jitkoff | G06F 16/955 715/777 |
| 2015/0220228 A1 | 8/2015 | Podemsky | |
| 2017/0185613 A1 | 6/2017 | Broomhall et al. | |
| 2017/0199638 A1 | 7/2017 | Bhupatiraju et al. | |
| 2017/0293419 A1 | 10/2017 | Dipin | |

FOREIGN PATENT DOCUMENTS

| | | |
|---|---|---|
| CN | 103488741 A | 1/2014 |
| CN | 104239545 A | 12/2014 |

OTHER PUBLICATIONS

International Search Report to corresponding International Application No. PCT/CN2016/103326 dated Feb. 7, 2017 (2 pages).

* cited by examiner

METHOD AND APPARATUS FOR GROUPING WEB PAGE LABELS IN A WEB BROWSER

CROSS-REFERENCE TO RELATED APPLICATIONS

The application claims priority to Chinese Patent Application No. 201510742568.5, filed on Nov. 4, 2015, and entitled "METHOD AND APPARATUS FOR GROUPING WEB PAGE LABELS" and PCT. Appl. No. PCT/CN16/103326 filed on Oct. 26, 2016, and entitled "METHOD AND DEVICE FOR DIVIDING WEB PAGE TABS INTO GROUPS," both of which are incorporated herein by reference in its entirety.

BACKGROUND

Technical Field

The disclosed embodiments relate to the field of data processing, and in particular, to a method and an apparatus for grouping web page labels displayed in a web browser.

Description of the Related Art

When a browser is used for browsing web pages, opened web pages will be arranged one after another in a tab bar of the browser in the format of web page labels. More web page labels will be arranged in the tab bar when more web pages are opened. Web page labels are arranged in the tab bar according to the sequence of time when the web page labels are generated. A web page label of a newly opened web page is arranged after a web page label of the currently presented web page.

When a user uses a browser to open many web pages, the web page labels in a tab bar of the browser are not ordered in any specific way. If intending to find a web page opened previously, the user needs to spend a certain period looking through a large number of web page labels in the tab bar to find the web page label corresponding to a previously opened web page, resulting in poor user experience.

A conventional solution involves grouping web page labels. A user can establish one or more groups in advance and distinguish one group from others by naming the groups, such as "work" and "shopping." Several specific Uniform Resource Locators (URLs) are set as one group. When a web page label is generated, a URL of the web page label is extracted and matched with the specific URLs set for the group. If the matching succeeds, the web page label is automatically added into the group matching successfully. For example, if a specific URL set for the group "shopping" is "www.taobao.com," then a web page label in the tab bar will be added into the group "shopping" if a URL of the web page label includes "www.taobao.com." After grouping, the tab bar of the browser would only have the group labels and any web page labels that have not been added to groups.

The conventional web page grouping manner has the following problem: after grouping, if a user needs to open a web page corresponding to a web page label that has been categorized into a group, the user first needs to identify in which group the web page label may be located. The user then needs to click at least twice to select the web page label after confirming the group. The first click comprises clicking a group label in which the web page label is located, obtaining a presentation interface displaying web page labels in the group. The second click comprises clicking the required web page label on the presentation interface. The multiple-click process is too complicated and leads to poor user experience.

SUMMARY

To solve the above technical problem, the disclosed embodiments provide a method and an apparatus for grouping web page labels, such that web page labels belonging to the same label group are arranged successively together in a tab bar. A user can then select a needed web page label with a single click, thus improving user experience.

Disclosed in embodiments are the following technical solutions.

A method for grouping web page labels, comprising: extracting titles of a plurality of web page labels in a tab bar of a browser; calculating semantic distances between the extracted plurality of titles; clustering web page labels corresponding to the plurality of titles based on the semantic distances between the plurality of titles; obtaining at least one label group based on the clustering, the one label group comprising at least one web page label; and sequentially arranging the at least one label group in the tab bar, wherein web page labels belonging to the same label group are successively arranged in the tab bar.

In one embodiment, the clustering the web page labels corresponding to the plurality of titles based on the semantic distances between the plurality of titles comprises: selecting at least one target title from the plurality of titles and clustering the web page labels corresponding to the plurality of titles according to semantic distances between non-target titles and the target titles in the plurality of titles, the quantity of the at least one label group obtained through the clustering being the same as the quantity of the at least one target title, wherein a label group is obtained according to a target title through the clustering.

In one embodiment, the calculating semantic distances between the extracted plurality of titles comprises: segmenting the plurality of titles, wherein a segmented word set is obtained by segmenting a title; calculating semantic sub-distances among segmented words in a plurality of obtained segmented word sets; and obtaining the semantic distances between the plurality of titles according to the semantic sub-distances.

In one embodiment, after the sequentially arranging the at least one label group in the tab bar, the method further comprises: if a new web page label appears in the tab bar, extracting a title of the new web page label; determining whether a semantic distance between the title of the new web page label and a title in the at least one label group meets a preset threshold; if a semantic distance between the title of the new web page label and a title in only one label group meets the preset threshold, adding the new web page label into the label group, and successively arranging the new web page label and web page labels of the label group in the tab bar; and if semantic distances between the title of the new web page label and titles in a plurality of label groups meet the preset threshold, adding the new web page label into the minimum label group, and successively arranging the new web page label and web page labels of the minimum label group in the tab bar; the minimum label group being a label group between the plurality of label groups having the shortest semantic distance between the title of this label group and the title of the new web page label.

In one embodiment, if the selecting is done by selecting at least one target title from the plurality of titles, clustering the web page labels corresponding to the plurality of titles according to semantic distances between non-target titles and the target title in the plurality of titles, the semantic distance between the title of the new web page label and the title in the at least one label group comprising: a semantic distance between the title of the new web page label and the target title of the at least one label group.

In one embodiment, after the sequentially arranging the at least one label group in the tab bar, the method further comprises: recording cases where the plurality of web page labels are used as clicked labels, a web page label corresponding to a web page presented by the browser being the clicked label; determining that a behavior similarity degree between a first web page label and a second web page label meets a preset similarity degree if a switch number of the web page labels used as the clicked labels switching continuously between a first web page label and a second web page label meets a preset number of times; and arranging the first web page label and the second web page label adjacently in the tab bar by moving the web page labels.

In one embodiment, if the selecting is done by selecting at least one target title from the plurality of titles, clustering the web page labels corresponding to the plurality of titles according to semantic distances between non-target titles and the target title in the plurality of titles; the arranging the first web page label and the second web page label adjacently in the tab bar by moving the web page labels comprises: moving the second web page label to an adjacent position of the first web page label in the tab bar if a semantic similarity degree between the first web page label and a central label of a label group where the first web page label locates is greater than a semantic similarity degree between the second web page label and a central label of a label group where the second web page label locates, the central label being a web page label corresponding to the target title in the label group, and the semantic similarity degree is obtained by calculation based on the semantic distance.

An apparatus for grouping web page labels, comprising: an extraction unit, configured to extract titles of a plurality of web page labels in a tab bar of a browser; a calculation unit, configured to calculate semantic distances between the extracted plurality of titles; a clustering unit, configured to cluster web page labels corresponding to the plurality of titles based on the semantic distances between the plurality of titles; a grouping unit, configured to obtain at least one label group based on the clustering, the one label group comprising at least one web page label; and an arrangement unit, configured to sequentially arrange the at least one label group in the tab bar, wherein web page labels belonging to the same label group are successively arranged in the tab bar.

In one embodiment, the clustering unit is specifically configured to select at least one target title from the plurality of titles and cluster the web page labels corresponding to the plurality of titles according to semantic distances between non-target titles and the target titles in the plurality of titles; the quantity of the at least one label group obtained through the clustering being the same as the quantity of the at least one target title, wherein a label group is obtained according to a target title through the clustering.

In one embodiment, the calculation unit is specifically configured to segment the plurality of titles, wherein a segmented word set is obtained by segmenting a title; calculate semantic sub-distances among segmented words in a plurality of obtained segmented word sets; and obtain the semantic distances between the plurality of titles according to the semantic sub-distances.

In one embodiment, the apparatus further comprises: the extraction unit is further configured to do the following: after the arrangement unit is triggered and if a new web page label appears in the tab bar, extract a title of the new web page label; a determining unit, configured to determine whether a semantic distance between the title of the new web page label and a title in the at least one label group meets a preset threshold; trigger a first adding unit if the determination result of the determining unit is that a semantic distance between the title of the new web page label and a title in only one label group meets the preset threshold; and trigger a second adding unit if the determination result of the determining unit is that semantic distances between the title of the new web page label and titles in a plurality of label groups meet the preset threshold; the first adding unit configured to add the new web page label into the label group, and successively arranging the new web page label and web page labels of the label group in the tab bar; and the second adding unit configured to add the new web page label into the minimum label group, and successively arranging the new web page label and web page labels of the minimum label group in the tab bar; the minimum label group being a label group between the plurality of label groups having the shortest semantic distance between the title of this label group and the title of the new web page label.

In one embodiment, if the clustering unit is specifically configured to select at least one target title from the plurality of titles, clustering the web page labels corresponding to the plurality of titles according to semantic distances between non-target titles and the target title in the plurality of titles; the determining unit is specifically configured to determine a semantic distance between the title of the new web page label and a target title of the at least one label group.

In one embodiment, the apparatus further comprises: a recording unit, configured to do the following: after the arrangement unit is triggered, record cases where the plurality of web page labels are used as clicked labels, a web page label corresponding to a web page presented by the browser being the clicked label; a comparison unit, configured to determine that a behavior similarity degree between a first web page label and a second web page label meets a preset similarity degree if a switch number of the web page labels used as the clicked labels switching continuously between a first web page label and a second web page label meets a preset number of times; and a moving unit, configured to arrange the first web page label and the second web page label adjacently in the tab bar by moving the web page labels.

In one embodiment, if the clustering unit is specifically configured to select at least one target title from the plurality of titles, clustering the web page labels corresponding to the plurality of titles according to semantic distances between non-target titles and the target title in the plurality of titles; the moving unit is specifically configured to move the second web page label to an adjacent position of the first web page label in the tab bar if a semantic similarity degree between the first web page label and a central label of a label group where the first web page label locates is greater than a semantic similarity degree between the second web page label and a central label of a label group where the second web page label locates, the central label being a web page label corresponding to the target title in the label group, and the semantic similarity degree being obtained by calculation based on the semantic distance.

As can be seen from the above technical solutions, titles of a plurality of web page labels in a tab bar of a browser are extracted, and semantic distances between the plurality of extracted titles are calculated. The web page labels corresponding to the plurality of titles are clustered based on the semantic distances between the plurality of titles, and sets obtained based on the clustering are used as label groups after grouping. The grouping based on the semantic distances between the titles of the web page labels can be automatically implemented by the browser or a system, thus avoiding a complicated operation of manually setting URLs for groups in advance in the conventional grouping manner; the method further expands the applicable range of the grouping manner. The at least one label group is arranged sequentially in the tab bar, wherein web page labels belonging to the same label group are successively arranged in the tab bar. As such, the web page labels are still presented to a user in the format of web page labels in the tab bar; and the user only needs to click once to select the needed web page label. Moreover, web page labels belonging to the same label group are successively arranged together in the tab bar, such that the web page labels in the tab bar are arranged and ordered; and a user can find a needed web page label quickly through the tab bar, thus improving user experience.

BRIEF DESCRIPTION OF THE DRAWINGS

To illustrate the technical solutions in the disclosed embodiments or the prior art more clearly, the drawings which need to be used in the description of the embodiments or the prior art will be introduced briefly below. The drawings described below are merely some embodiments of the disclosure, and those of ordinary skill in the art can also obtain other drawings according to these drawings without making creative efforts.

DETAILED DESCRIPTION

Figure 1:
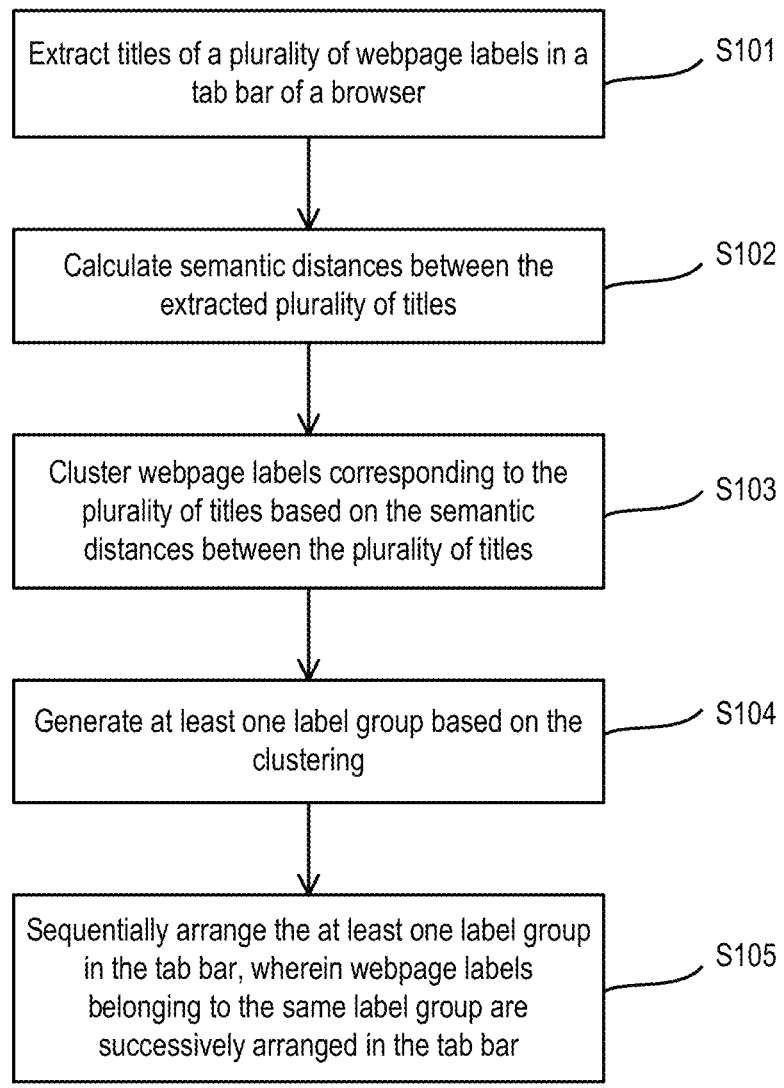
FIG. 1 is a flow diagram illustrating a method for grouping web page labels according to some embodiments of the disclosure.

To make the purposes, technical solutions, and advantages of the embodiments of the disclosure clearer, the technical solutions in the embodiments of the disclosure will be described below with reference to the drawings. The described embodiments are part of the embodiments of the disclosure, rather than all the embodiments. Based on the disclosed embodiments, all other embodiments obtained by those of ordinary skill in the art without making creative efforts shall fall within the protection scope of the disclosure.

When a browser is used for browsing web pages, the opened web pages will be arranged one after another in a tab bar of the browser in the format of web page labels. When a user uses a browser to open many web pages, the web page labels in a tab bar of the browser are not ordered in any specific way. If intending to find a web page opened previously, the user needs to spend a certain period looking through a large number of web page labels in the tab bar to find the web page label corresponding to the web page opened previously, resulting in poor user experience. The conventional solution involves grouping web page labels. A user can set several specific URLs. When a web page label is generated, a URL of the web page label is extracted and then matched with the specific URLs set for groups to perform grouping. After grouping, the tab bar of the browser would only have the group labels and web page labels that have not been added to the groups.

The above, conventional web page grouping technique has the following problem. After grouping, if a user needs to open a web page corresponding to a web page label that has been categorized into a group, the user needs to click at least twice to select the web page label. This multiple-click process is overly complicated and results in poor user experience.

Also, the conventional grouping technique of comparing URLs has a low grouping accuracy. For example, URLs of some web pages without shopping interfaces may also include "www.taobao.com," but they are still mistakenly categorized into a "shopping" group by the grouping mechanism. As such, when the user needs to view the web page subsequently, it is possible that the user cannot find the web page after searching for a long time because the web page label of the web page was categorized into the wrong group. This mis-grouping prolongs the time it takes for the user to find the web page label and frustrates the original intention of grouping the web page labels resulting in negative effects.

Therefore, the embodiments of the disclosure provide a method and an apparatus for grouping web page labels. Titles of a plurality of web page labels in a tab bar of a browser are extracted, and semantic distances between the plurality of extracted titles are calculated. The web page labels corresponding to the plurality of titles are clustered based on the semantic distances between the plurality of titles, and sets obtained based on the clustering are used as label groups after grouping. The grouping based on the semantic distances between the titles of the web page labels can be automatically implemented by the browser or a system, thus avoiding a complicated operation of manually setting URLs for groups in advance in the conventional grouping manner. The method also expands the applicable range of the grouping process. The at least one label group is arranged sequentially in the tab bar, where web page labels belonging to the same label group are successively arranged in the tab bar. As such, the web page labels are still presented to a user in the format of web page labels in the tab bar and the user only needs to click once to select the needed web page label. Moreover, web page labels belonging to the same label group are successively arranged together in the tab bar, such that the web page labels in the tab bar are arranged and ordered. Thus, a user can find a needed web page label quickly through the tab bar which improves the user experience.

Moreover, similar web page labels can be categorized into one label group more accurately by comparing semantic distances between the titles of the web page labels. This improves the accuracy of the web page label grouping and effectively reduces the number of situations where a user spends longer time searching for a web page label after web page labels are grouped.

After the web page labels are grouped, if a new web page label appears in the tab bar of the browser, a title of the new web page label is extracted. A semantic distance between the title of the new web page label and a title of a web page label in the at least one label group is calculated. It is then determined according to the semantic distance whether a matching label group in the at least one label group exists and to which the new web page label can be added. The new web page label is added into the matching label group after the matching label group is determined. The new web page label and web page labels of the label group into which the new web page label is added are arranged successively in the tab bar. As such, after the web page labels are grouped, even when a new web page label appears in the tab bar, the new web page label can also be arranged together with similar web page labels. This ensures an ordered arrangement of the web page labels in the tab bar.

Further, for a user's habit of using a browser for browsing web pages, a user continuously switching between two web pages to compare the prices during shopping is used as an example. In this example browsing process, the user needs to move the cursor a longer distance in the process of switching if web page labels of the two web pages are distantly arranged in the tab bar. In one embodiment, cases in which the web page labels in the tab bar are used as clicked labels are recorded. If the situation where the web page labels used as the clicked labels continuously switch between two web page labels occurs, positions of the two web page labels in the tab bar are adjusted to be adjacently arranged. This reduces the cursor moving distance in the process of switching between the two web page labels by the user, and improves user experience.

Embodiment 1

It should be noted that the condition for triggering web page label grouping may be the quantity of web page labels in a tab bar of a browser, or it could be a request sent actively to request for web page label grouping.

A browser, a third-party tool, or an operating system may execute the web page label grouping operation. This is not limited in the disclosed embodiments.

FIG. 1 is a flow diagram illustrating a method for grouping web page labels according to some embodiments of the disclosure. The method includes the following steps.

S101: Extract titles of a plurality of web page labels in a tab bar of a browser.

For example, a web page label has a corresponding title. The quantity of titles extracted from the plurality of web page labels is the same as the quantity of the plurality of web page labels. The plurality of web page labels may refer to two or more web page labels. A need to group web page labels arises when a plurality of web page labels exist in the tab bar.

Figure 2:
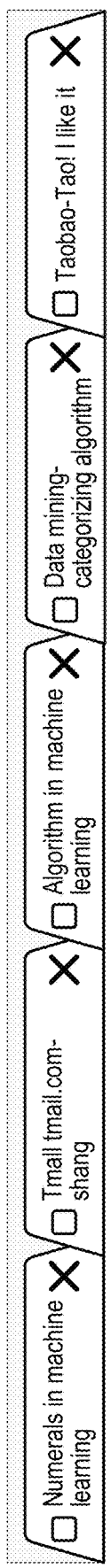
FIG. 2 is a user interface diagram of a tab bar of a browser according to some embodiments of the disclosure.

An example of web page labels in the tab bar of the browser is shown in FIG. 2. FIG. 2 is a user interface diagram of a tab bar of a browser according to some embodiments of the disclosure. There are five web page labels arranged in the tab bar of the browser in FIG. 2. Text parts displayed on the web page labels can be understood as titles of the web page labels. For example, a title of the rightmost web page label in the tab bar of FIG. 2 is "Taobao-Tao! I like it."

S102: Calculate semantic distances between the extracted plurality of titles.

For example, the semantic distance is a parameter representing a semantic similarity degree. A shorter semantic distance between two titles indicates closer or more similar semantic meanings of the two titles.

Optionally, for the calculating semantic distances between the extracted plurality of titles, one embodiment provides a manner for calculation among titles.

Figure 3:
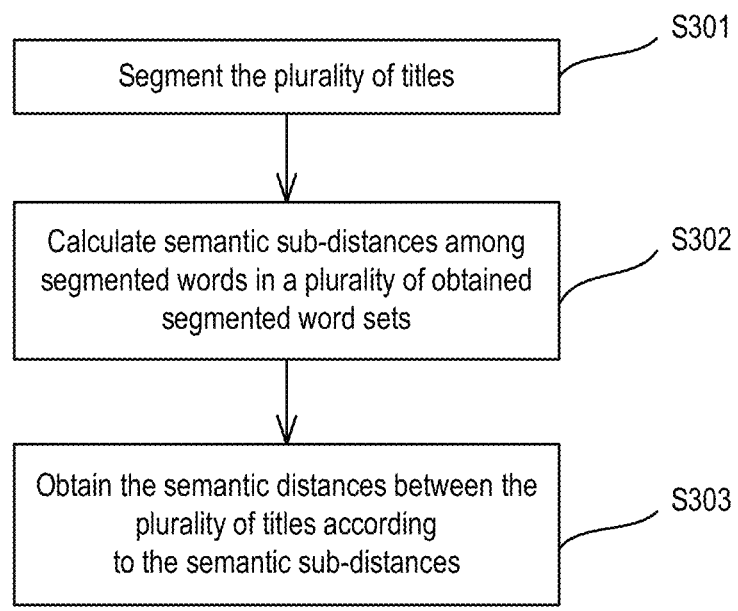
FIG. 3 is a flow diagram illustrating a method for calculating semantic distances among titles according to some embodiments of the disclosure.

FIG. 3 is a flow diagram illustrating a method for calculating semantic distances between titles according to some embodiments of the disclosure. The method includes the following steps.

S301: Segment the plurality of titles, wherein a segmented word set is obtained by segmenting a title.

For example, the segmenting is dividing a content of a title in terms of words. For example, segmented word sets obtained by segmenting the title "Taobao-Tao! I like it" may include: "Taobao," "Tao," "I," "like," and "it."

Optionally, A Chinese title may be segmented by using a segmenting tool such as IKANALYZER, PANGUSEGMENT, and PAODING, to decompose a title into a plurality of meaningful terms. If a title includes English, segmenting may be performed directly according to spaces in the English.

S302: Calculate semantic sub-distances among segmented words in a plurality of obtained segmented word sets.

For example, before the semantic sub-distances are calculated, stopwords in the segmented word sets may further be removed to improve the accuracy and calculation efficiency. The stopword refers to a word that repeatedly appears in a corpus but is a semantically light-weighted word. For example, in the segmented word sets obtained in S301, "I" is a common stopword and can be removed from the segmented word sets before semantic sub-distances are calculated. For example, common stopwords further include "in," "of," and the like.

How to calculate semantic distances or semantic sub-distances is not limited in the disclosure. An existing semantic distance calculation manner such as a WORD2VEC tool can be used.

How to calculate semantic sub-distances is illustrated by using the following example. Assuming that a segmented word set A includes "machine learning" and "Mathematics," and a segmented word set B includes "machine learning" and "algorithm." A semantic sub-distance between "machine learning" in the segmented word set A and "machine learning" in the segmented word set B is 0; and a semantic sub-distance between "Mathematics" in the segmented word set A and "algorithm" in the segmented word set B is 0.34.

S303: Obtain the semantic distances between the plurality of titles according to the semantic sub-distances.

The semantic distances between the titles can be calculated according to the plurality of semantic sub-distances obtained from S302 in various ways. To avoid the situation where an excessively large semantic distance exists due to too many lexical items of segmented words, one embodiment provides an optional manner for obtaining semantic distances between titles. That is, an average value of semantic sub-distances is calculated; and the average value obtained by the calculation is used as a semantic distance between titles. For example, a semantic distance between the segmented word set A and the segmented word set B can be an average value 0.17 of the two semantic sub-distances 0 and 0.34 obtained above.

S103: Cluster web page labels corresponding to the plurality of titles based on the semantic distances between the plurality of titles.

S104: Generate at least one label group based on the clustering, the one label group comprising at least one web page label.

For example, the disclosed embodiments are not limited to the clustering manner for performing clustering based on semantic distances. For example, optionally, the web page labels can be clustered by using a k-medoids algorithm. Or, an optional method is that the clustering can be performed by using an agglomerative hierarchical clustering manner.

If clustering is performed by using a manner that needs a convergence target, optionally, one embodiment provides a clustering manner in which during clustering, a convergence target is the target title or can be considered as the web page label corresponding to the target title. The quantity of label groups that need to be obtained by clustering is the same as the quantity of target titles that need to be selected to serve as convergence targets during clustering. The target title does not need to be selected manually by the user, and can be automatically selected through the logic of an algorithm.

In one embodiment, the clustering the web page labels corresponding to the plurality of titles based on the semantic distances between the plurality of titles comprises selecting at least one target title from the plurality of titles and clustering the web page labels corresponding to the plurality of titles according to semantic distances between non-target titles and the target titles in the plurality of titles. In one embodiment, the quantity of the at least one label group obtained through the clustering is the same as the quantity of the at least one target title, wherein a label group is obtained according to a target title through the clustering.

The quantity of target titles selected from the plurality of web page labels can be preset. For example, when the quantity of web page labels in the tab bar reaches N, n target titles are selected. Then, n label groups can be obtained after the clustering. When the quantity of web page labels in the tab bar reaches M, m target titles are selected, and m label groups can be obtained after the clustering. For a target title, if a semantic distance between a title A and the target title is less than a fixed value during clustering, a web page label corresponding to the title A and a web page label corresponding to the target title can be clustered into one category. One label group obtained based on the clustering includes at least one web page label. If only one web page label is included, the web page label is a web page label corresponding to the target title.

It should be noted that it can be considered that improvement on the conventional manner for grouping web page labels has been implemented based on the processing from S101 to S104. The grouping based on the semantic distances between the titles of the web page labels can be automatically implemented by the browser or a system, i.e., automatic grouping can be implemented, thus avoiding a complicated operation of manually setting URLs for groups in advance in the conventional grouping manner; the method further expands the applicable range of the grouping manner.

Next, for at least one label group obtained by the clustering, the disclosed embodiments may further provide an optional manner for presenting a tab bar, which still presents web page labels in a label group in the tab bar as individual web page labels. Therefore, the user only needs to click once to select a web page label in the label group.

S105: Sequentially arrange the at least one label group in the tab bar, the web page labels belonging to the at least one label group successively arranged in the tab bar.

For example, after the plurality of web page labels are grouped, the web page labels need to be rearranged in the tab bar in the form of "groups." From the perspective of the user, an actual outline of a label group will not be displayed in the tab bar in one embodiment. Rather, web page labels categorized into the label groups are still arranged sequentially as individual web page labels. No identifier will exist between label groups to serve as a boundary. That is, the existence of the label group is actually invisible to a user of the tab bar after the web page labels are grouped, causing no troubles to operations of the user. However, arrangement of web page labels is an ordered arrangement according to the grouping result, and similar web page labels are arranged together to save time for the user to search for a web page label.

Figure 4:
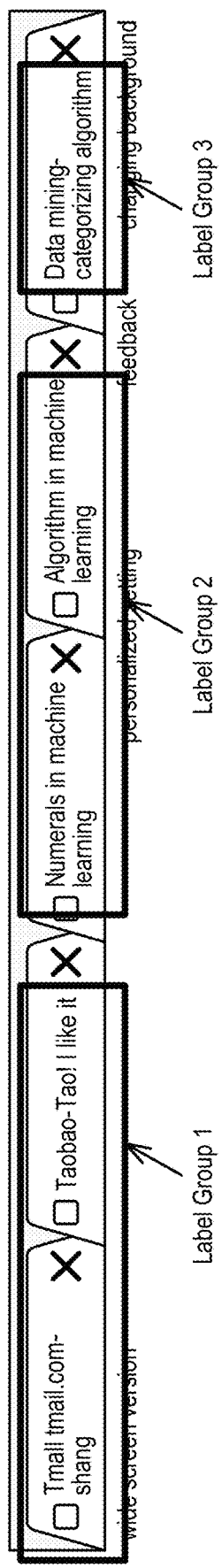
FIG. 4 is a user interface diagram of an arrangement of web page labels in a tab bar after a grouping of the web page labels according to some embodiments of the disclosure.

FIG. 4 is a user interface diagram of an arrangement of web page labels in a tab bar after a grouping of the web page labels according to some embodiments of the disclosure. It should be noted that boxes enclosing the web page labels in FIG. 4 are merely used for clearly identifying the existence of the label groups graphically; and no boxes as those in FIG. 4 will exist in the process of actual presentation. As shown in FIG. 4, by grouping the web page labels, the original five web page labels in FIG. 2 are grouped into three label groups, namely, a label group 1, a label group 2, and a label group 3. As can be seen, the web page labels categorized into the same label group are rearranged together in the tab bar, for example, web page labels "Tmall . . . " and "Taobao . . . " at the leftmost of FIG. 4.

Sequentially arranging the label groups can be understood as that when there is a plurality of label groups, web page labels of one label group are arranged in the tab bar first; web page labels of another label group are arranged next, and so on. The label group arranged first and the label groups arranged later are not limited in the disclosed embodiments. However, it is generally preferred to arrange web page labels in a label group at eye-catching positions in the tab bar. For example, a manner for arranging web page labels in a horizontal tab bar is generally from left to right; and a manner for arranging web page labels in a vertical tab bar is generally from top to bottom. The arrangement order can be set according to personal preferences. After web page labels of the label groups are arranged, if there are web page labels that are not categorized into any label group, these web page labels are arranged successively according to an arrangement order.

The successive arrangement of web page labels belonging to the same label group can be understood as that the web page labels of the same label group will be arranged together successively. A web page label categorized into a label group or not categorized into any label group will not be arranged between two web page labels in another label group. The arrangement order between the web page labels in a label group is not limited in the disclosed embodiments.

No identifier is used as a boundary between adjacent positions of web page labels in different label groups. For example, in FIG. 4, there is no difference between the adjacent web page labels "Taobao . . . " and "Numerals in machine learning . . . " belonging to the label group 1 and the label group 2 and the adjacent web page labels "Tmall . . . " and "Taobao . . . " which belong to the same label group. Although invisible to a user, the above technical effect of orderly arranged web page labels according to the grouping result, and arranging similar web page labels together is achieved.

As can be seen from this embodiment, titles of a plurality of web page labels in a tab bar of a browser are extracted, and semantic distances between the plurality of extracted titles are calculated. The web page labels corresponding to the plurality of titles are clustered based on the semantic distances between the plurality of titles, and sets obtained based on the clustering are used as label groups after grouping. The grouping based on the semantic distances between the titles of the web page labels can be automatically implemented by the browser or a system, thus avoiding a complicated operation of manually setting URLs for groups in advance in the conventional grouping manner; the method further expands the applicable range of the grouping manner. The at least one label group is arranged sequentially in the tab bar, wherein web page labels belonging to the same label group are successively arranged in the tab bar. As such, the web page labels are still presented to a user in the format of web page labels in the tab bar; and the user only needs to click once to select the needed web page label. Moreover, web page labels belonging to the same label group are successively arranged together in the tab bar, such that the web page labels in the tab bar are arranged and ordered; and a user can find a needed web page label quickly through the tab bar, thus improving user experience.

Embodiment 2

Figure 5:
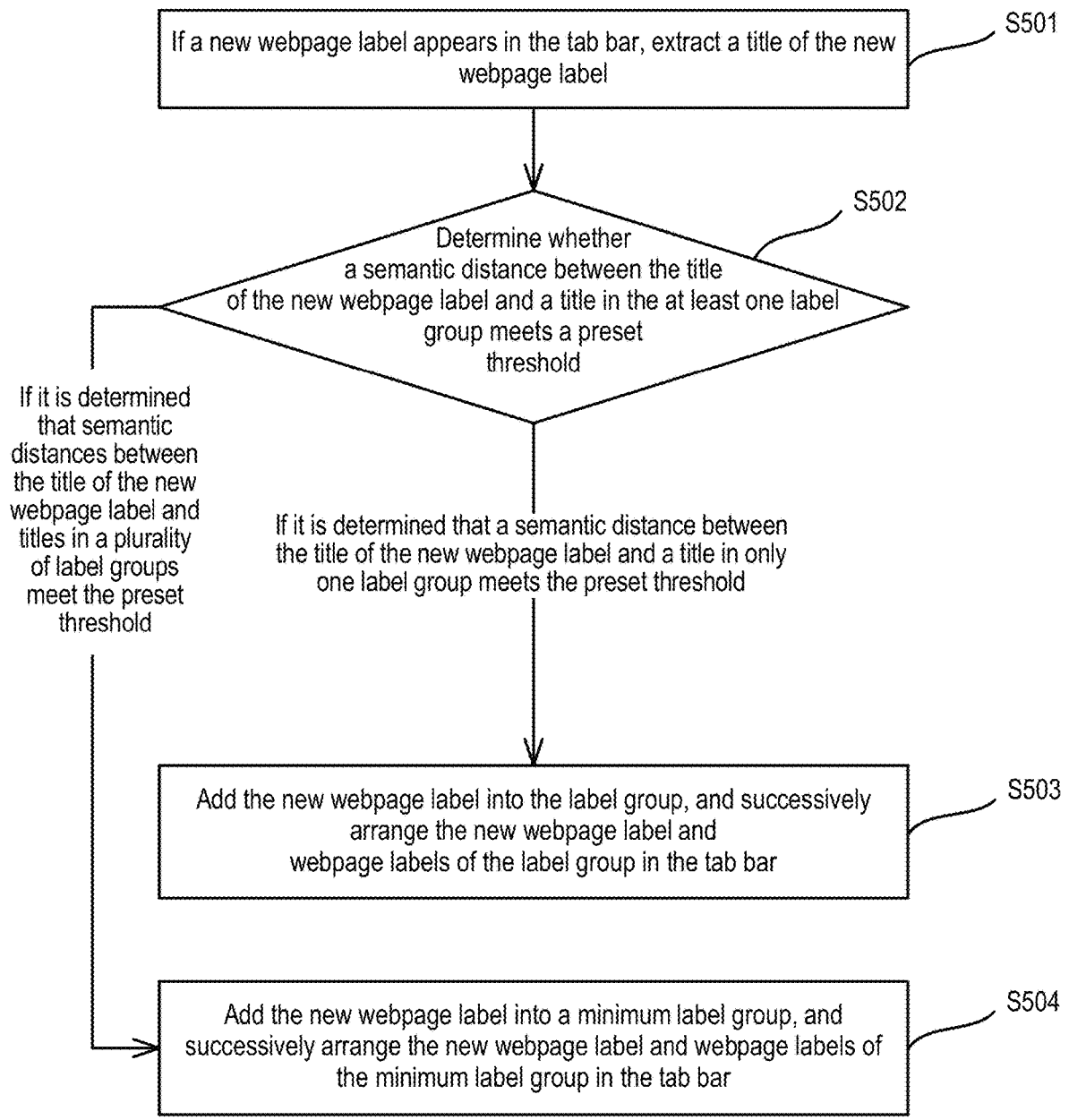
FIG. 5 is a flow diagram illustrating a method for categorizing web page labels according to some embodiments of the disclosure.

After a plurality of web page labels in a tab bar are grouped, a new web page label may further appear in the tab bar of a browser as the user continues using the browser. If the new web page label is not processed, the new web page label will be directly placed to the very end of the tab bar, thus damaging the original ordered arrangement state of the tab bar to some extent. For a web page label newly appearing after the grouping, one embodiment provides a manner for categorizing web page labels. On the basis of the embodiments corresponding to FIG. 1, after at least one label group is arranged sequentially in the tab bar, FIG. 5 shows a flow diagram illustrating a method for categorizing web page labels according to some embodiments of the disclosure.

S501: If a new web page label appears in the tab bar, extracting a title of the new web page label.

S502: Determine whether a semantic distance between the title of the new web page label and a title in the at least one label group meets a preset threshold. If a semantic distance between the title of the new web page label and a title in only one label group meets the preset threshold, S503 is performed. If semantic distances between the title of the new web page label and titles in a plurality of label groups meet the preset threshold, S504 is performed.

For example, the manner of acquiring a title of the new web page label and the manner of calculating a semantic distance between the titles of the new web page label and the web page label in the label group can be obtained by referring to the descriptions in the embodiments corresponding to FIG. 1. Details will not be repeated herein again.

In S502, for a label group, a semantic distance between the title of the new web page label and a title of any web page label in a label group can be calculated to serve as a determination reference in S502. However, to improve the determination accuracy, optionally, if the selecting is done by selecting at least one target title from the plurality of titles, the web page labels corresponding to the plurality of titles are clustered according to semantic distances between non-target titles and the target title in the plurality of titles. The semantic distance between the title of the new web page label and the title in the at least one label group includes a semantic distance between the title of the new web page label and the target title of the at least one label group.

S503: Add the new web page label into the label group, and successively arrange the new web page label and web page labels of the label group in the tab bar.

The arrangement order of the new web page label and other web page labels in the label group is not limited in the disclosed embodiments. For example, the new web page label can be placed in front of all other web page labels in the label group, or placed at the very end, or placed at a position in the middle.

S504: Add the new web page label into a minimum label group, and successively arrange the new web page label and web page labels of the minimum label group in the tab bar, the minimum label group being a label group between the plurality of label groups having the shortest semantic distance between the title of this label group and the title of the new web page label.

For example, if there is a plurality of label groups meeting the preset threshold, the selected minimum label group can be considered as having the shortest semantic distance between a title of a web page label in its own label group and the title of the new web page label. The similarity degree between the web page label in the minimum label group and the new web page label is the highest.

As can be seen from the above, after the web page labels are grouped, if a new web page label appears in the tab bar of the browser, a title of the new web page label is extracted; a semantic distance between the title of the new web page label and a title of a web page label in the at least one label group is calculated; and it is determined according to the semantic distance whether a matching label group in the at least one label group exists and to which the new web page label can be added. The new web page label is added into the matching label group after the matching label group is determined; and the new web page label and web page labels of the label group into which the new web page label is added are arranged successively in the tab bar. As such, after the web page labels are grouped, even when a new web page label appears in the tab bar, the new web page label can also be arranged together with similar web page labels, thus ensuring an ordered arrangement of the web page labels in the tab bar.

Further, the user's habit of frequently switching web pages when browsing web pages by using the browser is considered. For example, continuously switching between two web pages is generally needed to compare the prices during shopping. If web page labels of the two continuously switched web pages are arranged farther from each other in the tab bar, the user needs to move the cursor for a long distance to click the web page label in the process of each switching, which inevitably leads to poor user experience.

Figure 6:
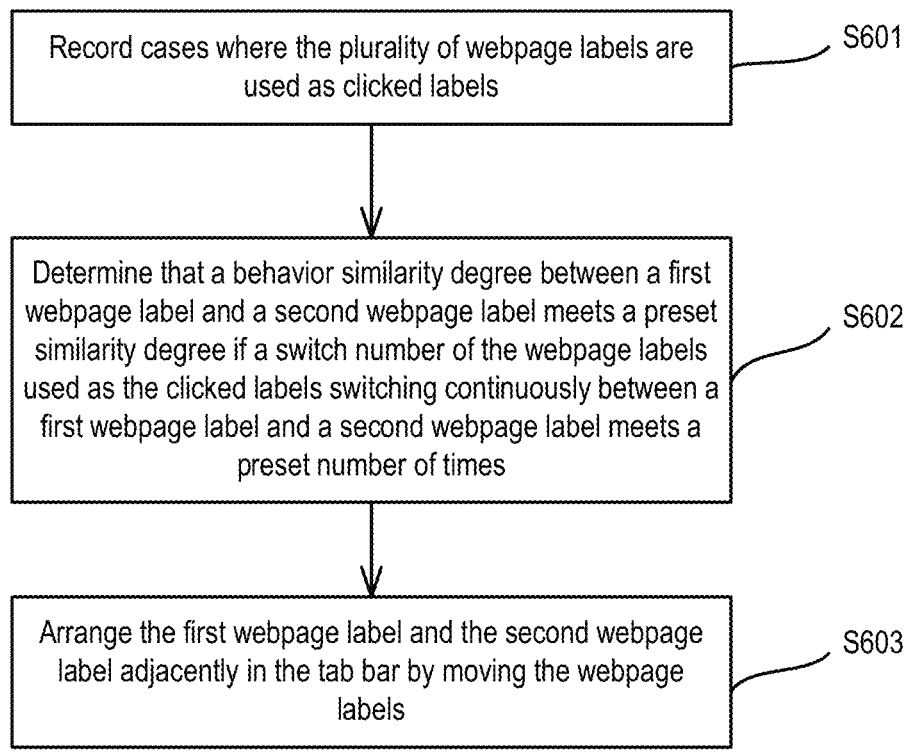
FIG. 6 is a flow diagram illustrating a method for adjusting positions of web page labels according to some embodiments of the disclosure.

Therefore, on the basis of the embodiment corresponding to FIG. 1, after at least one label group is arranged in the tab bar sequentially, FIG. 6 shows a flow diagram illustrating a method for adjusting positions of web page labels according to some embodiments of the disclosure. The method includes the following steps.

S601: Record cases where the plurality of web page labels are used as clicked labels, a web page label corresponding to a web page presented by the browser being the clicked label.

For example, after a web page label in the tab bar is clicked, the web page label has a clicked state in presentation. A web page corresponding to the web page label is presented on a main interface of the browser, and web pages corresponding to remaining web page labels are in a not-presented state. The user can click other web page labels to enable the selected web page label to be used as the clicked label.

S602: Determine that a behavior similarity degree between a first web page label and a second web page label meets a preset similarity degree if a switch number of the web page labels used as the clicked labels switching continuously between a first web page label and a second web page label meets a preset number of times.

For example, the continuous switching described in one embodiment can be understood as an operation of continuously clicking two web page labels back and forth. In other words, the continuous switching of the web page label as the clicked label between the first web page label and the second web page label may be considered as that the clicked label changes from the first web page label to the second web page label, then changes from the second web page label back to the first web page label; then changes from the first web page label to the second web page label, and so on as the user clicks back and forth. In one embodiment, the operation in which the clicked label is switched from the first web page label to the second web page label is considered as one switching. That is, the number of switches is incremented by one. The operation in which the clicked label is switched from the second web page label to the first web page label is also considered as one switching; that is, the number of switches is incremented by one. For example, a user uses a browser to browse a web page A having a corresponding web page label being a web page label A. Then the user views a web page B having a corresponding web page label being a web page label B. Then the user switches back to the web page A. The above operations can be recorded as that the switch number of the web page labels used as the clicked label switching continuously between the web page label A and the web page label B is two. After switching to the web page A, if the user starts to browse a web page C having a corresponding web page label being a web page label C, the previous record on the number of switches is removed and the number of switches of the web page labels used as the clicked labels switching continuously between the web page label A and the web page label C is recorded.

One embodiment provides a manner for conveniently calculating a behavior similarity degree between the first web page label and the second web page label based on the number of continuous switches. The specific calculation can be seen in the following formula:

$$sim = \frac{2}{(1+e^{-x})} - 1$$

where sim denotes a behavior similarity degree between the first web page label and the second web page label; and x denotes the number of switches of the web page labels used as the clicked labels switching continuously between the first web page label and the second web page label.

The preset number of switches can be set according to conditions of label groups where the first web page label and the second web page label locate. For example, if the first web page label and the second web page label belong to the same label group, the preset number of switches can be set to be relatively small. If the first web page label and the second web page label belong to different label groups, the preset number of switches can be set to be relatively large.

S603: Arrange the first web page label and the second web page label adjacently in the tab bar by moving the web page labels.

The specific means to move the position of the web page label in the tab bar is not limited in the disclosed embodiments. For example, it is possible that the first web page label is moved to an adjacent position of the second web page label, or the second web page label is moved to an adjacent position of the first web page label; or the first web page label and the second web page label are moved simultaneously such that the first web page label and the second web page label locate in any adjacent positions in the tab bar. However, the following can be implemented in order to ensure ordered arrangement of web page labels in the tab bar. If the selecting is done by selecting at least one target title from the plurality of titles, the web page labels corresponding to the plurality of titles are clustered according to semantic distances between non-target titles and the target title in the plurality of titles. One embodiment provides a manner of moving web page labels and the arranging the first web page label and the second web page label adjacently in the tab bar by moving the web page labels includes moving the second web page label to an adjacent position of the first web page label in the tab bar if a semantic similarity degree between the first web page label and a central label of a label group where the first web page label locates is greater than a semantic similarity degree between the second web page label and a central label of a label group where the second web page label locates, the central label being a web page label corresponding to the target title in the label group, and the semantic similarity degree being obtained by calculation based on the semantic distance.

In other words, if the first web page label is more similar to the central label of the label group where the first web page label locates than the second web page label to the central label of the label group where the second web page label locates, the second web page label is moved to an adjacent position of the first web page label. The adjacent position is described by using a horizontal tab bar as an example. Here, the adjacent position may be an adjacent position at left of the first web page label or an adjacent position at right of the web page label. After the second web page label is moved, the second web page label may locate in the tab bar among web page labels in the label group where the first web page label locates.

Figure 7:
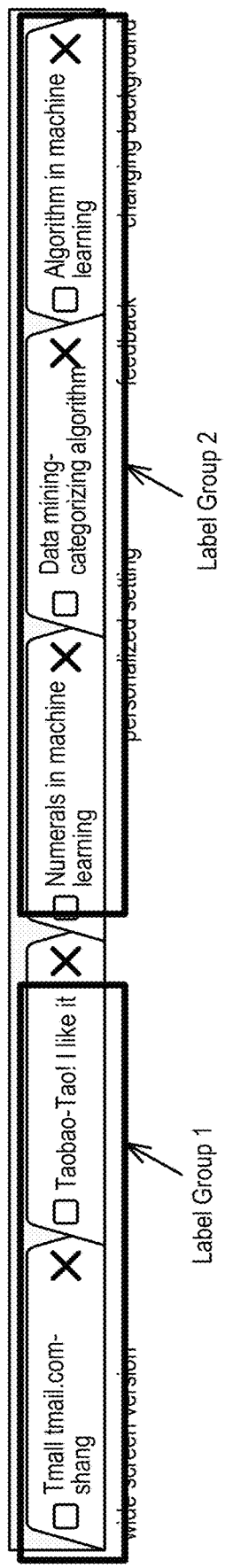
FIG. 7 is a user interface diagram of an arrangement of web page labels in a tab bar after moving of the web page labels according to some embodiments of the disclosure.

Now FIG. 4 is used as an example. On the basis of FIG. 4, assuming that the user continuous switches between the web page labels "algorithm in machine learning . . . " and "data mining . . . ," which belong to two different label groups, and the number of switches exceeds a preset number of switches, the web page label "data mining . . . " may be moved to a position adjacent to the web page label "algorithm in machine learning . . . " The tab bar after the moving may be as that shown in FIG. 7.

As can be seen from the above that cases in which the web page labels in the tab bar are used as clicked labels are recorded; and if the situation where the web page labels used as the clicked labels continuously switch between two web page labels occurs, positions of the two web page labels in the tab bar are adjusted to be adjacently arranged, thus reducing the cursor moving distance in the process of switching between the two web page labels by the user, and improving user experience.

Embodiment 3

Figure 8:
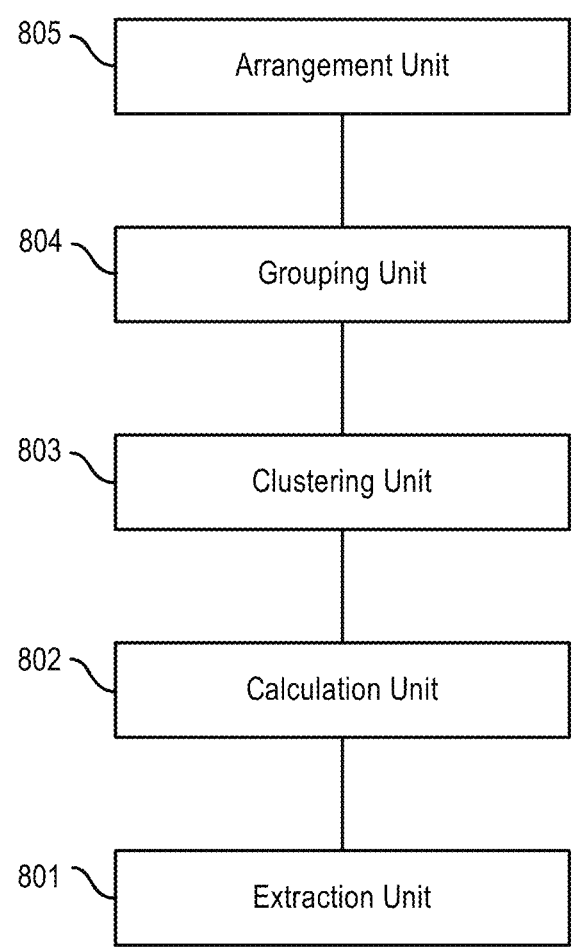
FIG. 8 is a block diagram of an apparatus for grouping web page labels according to some embodiments of the disclosure.

FIG. 8 is a block diagram of an apparatus for grouping web page labels according to some embodiments of the disclosure, the apparatus including the following units.

An extraction unit 801 configured to extract titles of a plurality of web page labels in a tab bar of a browser.

A calculation unit 802 configured to calculate semantic distances between the extracted plurality of titles.

Optionally, the calculation unit is specifically configured to segment the plurality of titles, wherein a segmented word set is obtained by segmenting a title; calculate semantic sub-distances among segmented words in a plurality of obtained segmented word sets; and obtain the semantic distances between the plurality of titles according to the semantic sub-distances.

A clustering unit 803, configured to cluster web page labels corresponding to the plurality of titles based on the semantic distances between the plurality of titles.

Optionally, the clustering unit 803 is specifically configured to select at least one target title from the plurality of titles and cluster the web page labels corresponding to the plurality of titles according to semantic distances between non-target titles and the target titles in the plurality of titles; the quantity of the at least one label group obtained through the clustering being the same as the quantity of the at least one target title, wherein a label group is obtained according to a target title through the clustering.

A grouping unit 804, configured to obtain at least one label group based on the clustering, the one label group comprising at least one web page label.

An arrangement unit 805, configured to sequentially arrange the at least one label group in the tab bar, wherein web page labels belonging to the same label group are successively arranged in the tab bar.

As can be seen from this embodiment, titles of a plurality of web page labels in a tab bar of a browser are extracted, and semantic distances between the plurality of extracted titles are calculated. The web page labels corresponding to the plurality of titles are clustered based on the semantic distances between the plurality of titles, and sets obtained based on the clustering are used as label groups after grouping. The grouping based on the semantic distances between the titles of the web page labels can be automatically implemented by the browser or a system, thus avoiding a complicated operation of manually setting URLs for groups in advance in the conventional grouping manner; the method further expands the applicable range of the grouping manner. The at least one label group is arranged sequentially in the tab bar, wherein web page labels belonging to the same label group are successively arranged in the tab bar. As such, the web page labels are still presented to a user in the format of web page labels in the tab bar; and the user only needs to click once to select the needed web page label. Moreover, web page labels belonging to the same label group are successively arranged together in the tab bar, such that the web page labels in the tab bar are arranged and ordered; and a user can find a needed web page label quickly through the tab bar, thus improving user experience.

Embodiment 4

Figure 9:
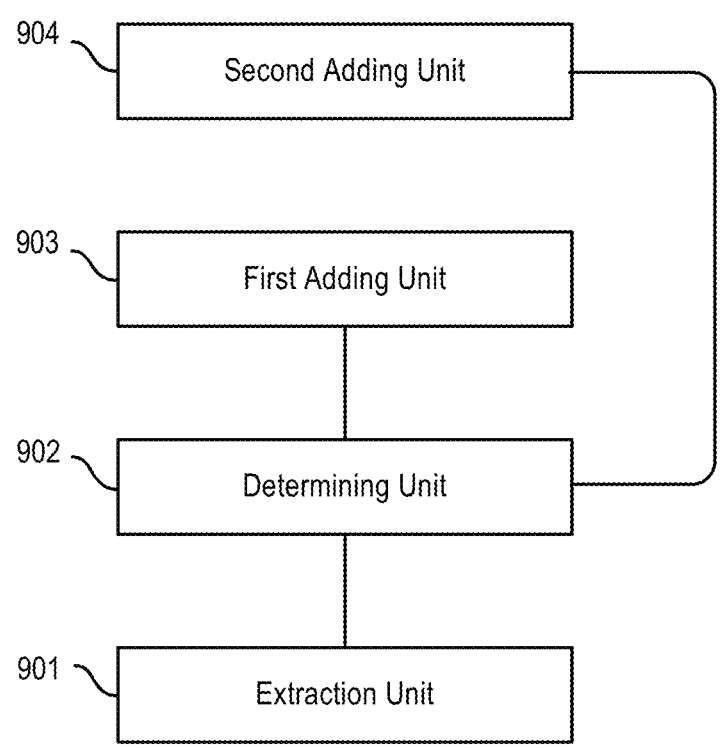
FIG. 9 is a block diagram of an apparatus for categorizing web page labels according to some embodiments of the disclosure.

After a plurality of web page labels in a tab bar are grouped, a new web page label may further appear in the tab bar of a browser as the user continues using the browser. If the new web page label is not processed, the new web page label will be directly placed to the very end of the tab bar, thus damaging the original ordered arrangement state of the tab bar to some extent. For the web page label newly appearing after the grouping, one embodiment provides an apparatus for categorizing web page labels. On the basis of the embodiment corresponding to FIG. 8, after the arrangement unit is triggered to sequentially arrange at least one label group in the tab bar, FIG. 9 shows a block diagram of an apparatus for categorizing web page labels according to some embodiments of the disclosure.

An extraction unit 901 is configured to, if a new web page label appears in the tab bar, extract a title of the new web page label.

A determining unit 902 is configured to determine whether a semantic distance between the title of the new web page label and a title in the at least one label group meets a preset threshold; trigger a first adding unit 903 if the determination result of the determining unit is that a semantic distance between the title of the new web page label and a title in only one label group meets the preset threshold; and trigger a second adding unit 904 if the determination result of the determining unit is that semantic distances between the title of the new web page label and titles in a plurality of label groups meet the preset threshold.

Optionally, if the clustering unit 803 is specifically configured to select at least one target title from the plurality of titles, clustering the web page labels corresponding to the plurality of titles according to semantic distances between non-target titles and the target title in the plurality of titles.

The determining unit 902 is specifically configured to determine a semantic distance between the title of the new web page label and a target title of the at least one label group.

The first adding unit 903 is configured to add the new web page label into the label group, and successively arranging the new web page label and web page labels of the label group in the tab bar.

The second adding unit 904 is configured to add the new web page label into the minimum label group, and successively arranging the new web page label and web page labels of the minimum label group in the tab bar; the minimum label group being a label group between the plurality of label groups having the shortest semantic distance between the title of this label group and the title of the new web page label.

As can be seen from the above, after the web page labels are grouped, if a new web page label appears in the tab bar of the browser, a title of the new web page label is extracted; a semantic distance between the title of the new web page label and a title of a web page label in the at least one label group is calculated; and it is determined according to the semantic distance whether a matching label group in the at least one label group exists and to which the new web page label can be added. The new web page label is added into the matching label group after the matching label group is determined; and the new web page label and web page labels of the label group into which the new web page label is added are arranged successively in the tab bar. As such, after the web page labels are grouped, even when a new web page label appears in the tab bar, the new web page label can also be arranged together with similar web page labels, thus ensuring an ordered arrangement of the web page labels in the tab bar.

Further, the user's habit of frequently switching web pages when browsing web pages by using the browser is considered. For example, continuously switching between two web pages is generally needed to compare the prices during shopping; and if web page labels of the two continuously switched web pages are arranged farther from each other in the tab bar, the user needs to move the cursor for a long distance to click the web page label in the process of each switching, which inevitably leads to poor user experience.

Figure 10:
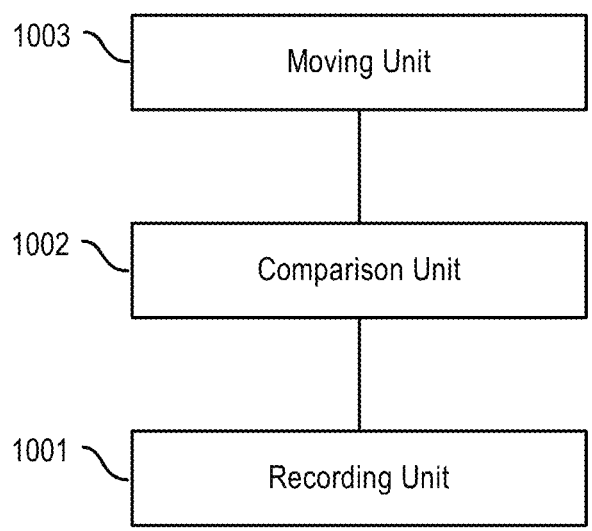
FIG. 10 is a block diagram of an apparatus for adjusting positions of web page labels according to some embodiments of the disclosure.

Therefore, on the basis of the embodiment corresponding to FIG. 8, after at least one label group is arranged sequentially in the tab bar, FIG. 10 shows a block diagram of an apparatus for adjusting positions of web page labels according to some embodiments of the disclosure. The apparatus includes the following units.

A recording unit 1001, configured to do the following: after the arrangement unit is triggered, record cases where the plurality of web page labels are used as clicked labels, a web page label corresponding to a web page presented by the browser being the clicked label.

A comparison unit 1002, configured to determine that a behavior similarity degree between a first web page label and a second web page label meets a preset similarity degree if a switch number of the web page labels used as the clicked labels switching continuously between a first web page label and a second web page label meets a preset number of times.

A moving unit 1003, configured to arrange the first web page label and the second web page label adjacently in the tab bar by moving the web page labels.

Optionally, if the clustering unit 803 is specifically configured to select at least one target title from the plurality of titles, clustering the web page labels corresponding to the plurality of titles according to semantic distances between non-target titles and the target title in the plurality of titles.

The moving unit 1003 is specifically configured to move the second web page label to an adjacent position of the first web page label in the tab bar if a semantic similarity degree between the first web page label and a central label of a label group where the first web page label locates is greater than a semantic similarity degree between the second web page label and a central label of a label group where the second web page label locates, the central label being a web page label corresponding to the target title in the label group, and the semantic similarity degree being obtained by calculation based on the semantic distance.

As can be seen from the above that cases in which the web page labels in the tab bar are used as clicked labels are recorded; and if the situation where the web page labels used as the clicked labels continuously switch between two web page labels occurs, positions of the two web page labels in the tab bar are adjusted to be adjacently arranged, thus reducing the cursor moving distance in the process of switching between the two web page labels by the user, and improving user experience.

Those of ordinary skill in the art may understand that all or part of the steps for implementing the method embodiments above may be completed by a program instructing relevant hardware. The foregoing program may be stored in a computer-readable storage medium, and when executed, the program may perform the steps of the method embodiments above. The foregoing storage medium may be at least one of the following media: a read-only memory (ROM), a RAM, a magnetic disk, an optical disc, and other media that can store program code.

It should be noted that the embodiments in this specification are described in a progressive manner, and for the same or similar parts in the embodiments, reference may be made to each other, and each embodiment focuses on differences from other embodiments. In particular, for the device and system embodiments, because they are basically similar to the method embodiments, the description is relatively simple, and for relevant parts, reference may be made to the descriptions in the method embodiment section. The apparatus and system embodiments described above are merely exemplary. The units described as separate parts may or may not be physically separate, and the components shown as units may or may not be physical units, that is, the components may be located in one place or may be distributed onto a plurality of network units. The objectives of the solutions of the embodiments can be achieved by selecting parts or all of the modules according to actual requirements. Those of ordinary skill in the art can understand and implement them without creative efforts.

The above descriptions are merely preferred specific implementations of the disclosed embodiments, but the scope of the disclosed embodiments is not limited thereto. Changes or replacements that any person skilled in the art can easily conceive of within the technical scope disclosed by the disclosed embodiments should be covered by the scope of the disclosed embodiments. Therefore, the scope of the disclosed embodiments invention should be subject to the scope of the claims.

What is claimed is:

1. A method comprising:
    extracting, by a processor, titles from web page labels in a tab bar of a browser;
    calculating, by the processor, semantic distances between the titles, a semantic distance representing a similarity between two titles;
    clustering, by the processor, the web page labels based on the semantic distances associated with the titles;
    generating, by the processor, a label group based on the clustering, the label group comprising a subset of the web page labels; and
    arranging, by the processor, the label group in the tab bar, the subset of the web page labels associated with the label group successively arranged in the tab bar.

2. The method of claim 1, the calculating semantic distances further comprising:
    segmenting, by the processor, each title in the titles, the segmenting generating a segmented word set for each title;
    calculating, by the processor, semantic sub-distances among words in the segmented word sets; and
    calculating, by the processor, the semantic distances using the semantic sub-distances.

3. The method of claim 2, the segmenting each title further comprising removing, by the processor, stopwords from each segmented word set.

4. The method of claim 2, the calculating the semantic distance using the semantic sub-distances comprising averaging, by the processor, the semantic sub-distances for a given segment word set.

5. The method of claim 1, the clustering the web page labels comprising clustering using one of a k-medoids clustering algorithm or an agglomerative hierarchical clustering algorithm.

6. The method of claim 1, the arranging the label group in the tab bar comprising displaying the label group at a first position without a visible boundary around the subset of the web page labels in the label group.

7. The method of claim 1, the clustering the web page labels comprising:
    selecting, by the processor, at least one target title from the titles; and
    clustering, by the processor, the web page labels based on semantic distances between the target title and remaining titles, the remaining titles comprising a subset of titles in the titles other than the target title.

8. The method of claim 1, further comprising:
  detecting, by the processor, a new web page label appearing in the tab bar;
  extracting, by the processor, a new title from the new web page label;
  determining, by the processor, whether a semantic distance between the new title and a title in the label group meets a preset threshold; and
  inserting, by the processor, the new web page label in the label group if the semantic distance exceeds the preset threshold.

9. The method of claim 8, the determining whether a semantic distance between the new title and a title in the label group meets a preset threshold further comprising:
  determining, by the processor, that a semantic distance between the new title and a title in a second label group exceeds a preset threshold;
  selecting, by the processor, a minimum label group, the minimum label group comprising a label group having a shortest semantic distance between a title of the label group and the new title; and
  using, by the processor, the minimum label group as the label group for the inserting.

10. The method of claim 1, further comprising:
  recording, by the processor, click events received for the web page labels;
  determining, by the processor, that a behavior similarity degree between a first web page label and a second web page label in the web page labels meets a preset similarity degree if a switch number of the first web page label and a second web page label switching continuously between a first web page label and a second web page label meets a preset number of times; and
  arranging, by the processor, the first web page label and the second web page label adjacently in the tab bar by moving the web page labels.

11. An apparatus comprising:
  a processor; and
  a storage medium for tangibly storing thereon program logic for execution by the processor, the stored program logic comprising:
    logic, executed by the processor, for extracting titles from web page labels in a tab bar of a browser;
    logic, executed by the processor, for calculating semantic distances between the titles, a semantic distance representing a similarity between two titles;
    logic, executed by the processor, for clustering the web page labels based on the semantic distances associated with the titles;
    logic, executed by the processor, for generating a label group based on the clustering, the label group comprising a subset of the web page labels; and
    logic, executed by the processor, for arranging the label group in the tab bar, the subset of the web page labels associated with the label group successively arranged in the tab bar.

12. The apparatus of claim 11, the logic for calculating semantic distances further comprising:
  logic, executed by the processor, for segmenting each title in the titles, the segmenting generating a segmented word set for each title;
  logic, executed by the processor, for calculating semantic sub-distances among words in the segmented word sets; and
  logic, executed by the processor, for calculating the semantic distances using the semantic sub-distances.

13. The apparatus of claim 12, the logic for segmenting each title further comprising logic, executed by the processor, for removing stopwords from each segmented word set.

14. The apparatus of claim 12, the logic for calculating the semantic distance using the semantic sub-distances comprising logic, executed by the processor, for averaging the semantic sub-distances for a given segment word set.

15. The apparatus of claim 12, the logic for clustering the web page labels comprising logic, executed by the processor, for clustering using one of a k-medoids clustering algorithm or an agglomerative hierarchical clustering algorithm.

16. The apparatus of claim 11, the logic for arranging the label group in the tab bar comprising logic, executed by the processor, for displaying the label group at a first position without a visible boundary around the subset of the web page labels in the label group.

17. The apparatus of claim 11, the logic for clustering the web page labels comprising:
  logic, executed by the processor, for selecting at least one target title from the titles; and
  logic, executed by the processor, for clustering the web page labels based on semantic distances between the target title and remaining titles, the remaining titles comprising a subset of titles in the titles other than the target title.

18. The apparatus of claim 11, further comprising:
  logic, executed by the processor, for detecting a new web page label appearing in the tab bar;
  logic, executed by the processor, for extracting a new title from the new web page label;
  logic, executed by the processor, for determining whether a semantic distance between the new title and a title in the label group meets a preset threshold; and
  logic, executed by the processor, for inserting the new web page label in the label group if the semantic distance exceeds the preset threshold.

19. The apparatus of claim 18, the logic for determining whether a semantic distance between the new title and a title in the label group meets a preset threshold further comprising:
  logic, executed by the processor, for determining that a semantic distance between the new title and a title in a second label group exceeds a preset threshold;
  logic, executed by the processor, for selecting a minimum label group, the minimum label group comprising a label group having a shortest semantic distance between a title of the label group and the new title; and
  logic, executed by the processor, for using the minimum label group as the label group for the inserting.

20. The apparatus of claim 11, the stored program logic further comprising:
  logic, executed by the processor, for recording click events received for the web page labels;
  logic, executed by the processor, for determining that a behavior similarity degree between a first web page label and a second web page label in the web page labels meets a preset similarity degree if a switch number of the first web page label and a second web page label switching continuously between a first web page label and a second web page label meets a preset number of times; and logic, executed by the processor, for arranging the first web page label and the second web page label adjacently in the tab bar by moving the web page labels.

\* \* \* \* \*